United States Patent [19]
Goel et al.

[11] Patent Number: 5,875,447
[45] Date of Patent: *Feb. 23, 1999

[54] REORDERING OF COMPLEX SQL QUERIES INVOLVING GROUPBYS, JOINS, OUTER JOINS AND FULL OUTER JOINS

[75] Inventors: Piyush Goel, Monte Serano; Balakrishna Raghavandra Iyer, San Jose, both of Calif.

[73] Assignee: International Business Machines Corporation, Armonk, N.Y.

[*] Notice: The term of this patent shall not extend beyond the expiration date of Pat. No. 5,713,015.

[21] Appl. No.: 904,517

[22] Filed: Aug. 1, 1997

Related U.S. Application Data

[63] Continuation of Ser. No. 655,300, May 30, 1996, Pat. No. 5,713,015.

[51] Int. Cl.$^6$ .................................................. G06F 17/30
[52] U.S. Cl. .................................................. 707/4; 707/2
[58] Field of Search ........................................ 707/2, 3, 4

[56] References Cited

U.S. PATENT DOCUMENTS

| | | | |
|---|---|---|---|
| 5,367,675 | 11/1994 | Cheng et al. | 707/2 |
| 5,412,804 | 5/1995 | Krishna | 707/2 |
| 5,557,791 | 9/1996 | Cheng et al. | 707/2 |
| 5,659,728 | 8/1997 | Bhargava et al. | 707/2 |
| 5,680,603 | 10/1997 | Bhargava et al. | 707/2 |
| 5,701,454 | 12/1997 | Bhargava et al. | 1/1 |
| 5,701,455 | 12/1997 | Bhargava et al. | 1/1 |
| 5,713,015 | 1/1998 | Goel et al. | 1/1 |
| 5,724,568 | 3/1998 | Bhargava et al. | 1/1 |

OTHER PUBLICATIONS

Gautam Bhargava et al., "Efficient Processing of Outer Joins and Aggregate Functions", 1996, 12th International Conference on Data Engineering, IEEE, pp. 441–449.

Pintsang Chang, "Nonlinear Versus Linear Recursion: A Perspective from Computing Transitive Closure of a Binary Relation by the Join Domain Nested Loops Approach", 1990, Compsac, pp. 382–390.

*Primary Examiner*—Paul V. Kulik
*Attorney, Agent, or Firm*—Merchant, Gould, Smith, Edell, Welter, & Schmidt

[57] ABSTRACT

A method, apparatus, and article of manufacture for query simplification by applying generalized inference propagation and generalized transitive closure in SQL queries having selection, projection, join, outer join, and intersection operations. The disclosed transformations and enumeration method unify and solve the problems of 1) unnesting join aggregate queries, and 2) complete enumeration of queries containing outer joins, when the outer join predicate references an aggregated value, or the predicate references more than two base relations in a query subtree. The system first eliminates redundant sub-expressions and modifies expensive binary operations to inexpensive binary operations, then converts complex predicates to simple predicates by application of a generalized selection (GS) operator.

39 Claims, 4 Drawing Sheets

REORDERING OF COMPLEX SQL QUERIES INVOLVING GROUPBYS, JOINS, OUTER JOINS AND FULL OUTER JOINS

CROSS-REFERENCE TO RELATED APPLICATION

This application is a continuation of commonly-assigned patent application Ser. No. 08/655,300, filed May 30, 1996, which has issued as U.S. Pat. No. 5,713,015, by Piyush Goel et al., and entitled "REORDERING OF COMPLEX SQL QUERIES INVOLVING GROUPBYS, JOINS, OUTER JOINS AND FULL OUTER JOINS," attorney's docket number ST996003, which is incorporated by reference herein.

BACKGROUND OF THE INVENTION

1. Field of the Invention

This invention relates in general to database management systems performed by computers, and in particular, to a method, apparatus, and article of manufacture for the reordering of complex structured query language (SQL) queries involving GROUPBYs, joins, outer joins and full outer joins.

2. Description of Related Art

The current state-of-the-art in query optimization has few results for optimizing query expressions involving GROUPBYs, joins, outer joins, and full outer joins specified with predicates that either reference more than two relations or reference columns generated by aggregations. Several researchers have performed work in this area, as reflected in the following publications, all of which are incorporated by reference herein:

- Bhargava, G., Goel, P. and Iyer, B., "Reordering of complex queries involving joins and outer joins," *IBM Technical Report TR*03.567, July 1994, (hereinafter referred to as "[BHAR94]");
- Bhargava, G., Goel, P. and Iyer, B., "Hypergraph based reorderings of outer join queries with complex predicates," *SIGMOD*, 1995, pp. 304–315, (hereinafter referred to as "[BHAR95]");
- Ganski, R., and Wong, H. K. T., "Optimization of nested SQL queries revisited," *SIGMOD*, 1987, (hereinafter referred to as "[GANS87]");
- Galindo-Legaria, C., and Rosenthal, A., "How to extend a conventional optimizer to handle one- and two-sided outerjoin", *Proceedings of Data Engineering*, pp. 402–409, 1992, (hereinafter referred to as "[GALI92a]")
- Harinarayan, V. and Gupta, A., "Optimization using tuple subsumption", *ICDT*, Prague, January 1995, (hereinafter referred to as "[HARI94]");
- Levy, Alon Y., Mumick, I. S. and Sagiv, Y., "Query optimization by predicate move-around", *VLDB*, pp. 96–107, 1994, (hereinafter referred to as "[LEVY94]");
- Muralikrishna, M., "Improved Unnesting Algorithms for Join Aggregate SQL Queries", *Proceedings of* 18*th VLDB Con.*, pp 91–102, Vancouver, British Columbia, Canada, 1992, (hereinafter referred to as "[MURA92]");
- Pirahesh, H., Hellerstein, J. M. and Hasan, W., "Extensible/rule based query rewrite optimization in Starburst,"*SIGMOD*, pp. 39–48, San Diego, Calif., June 1992, (hereinafter referred to as "[PIRA92]")
- Paulley, G. N. and Larson, P-A., "Exploiting uniqueness in query optimization," *CASCON*, pp. 804–822, Vol. II, October 1993, (hereinafter referred to as "[PAUL93]");
- Selinger, P. G., Astrahan, M. M., Chamberlin, D. D., Lorie, R. A. and Price, T. G., "Access path selection in a relational database management system," *SIGMOD*, pp. 23–34, 1979, (hereinafter referred to as "[SELI79]").

However, there are numerous problems in the above prior art techniques. More specifically, [BHAR94] and [BHAR95] have proposed algorithms to reorder queries containing outer join predicates that reference two or more relations, but their work can only do partial reorderings and cannot reorder join aggregate queries.

With regard to join aggregate queries, consider the following query:

View $V_1$
SELECT $R_1.a$ AS a, $R_2.a$ AS b, c=count $(R_1)$
FROM $R_1$, $R_2$
WHERE $R_1.b$ $\theta_1$ $R_2.b$
GROUPBY $R_1.c$, $R_2.d$
Query 1
SELECT $R_3.a$, $R_4.b$, $R_2.b$
FROM (SELECT * FROM $V_1$ LEFTOUTERJOIN $R_3$ ON $R_3.b$ $\theta_2$ $V_1.c$), $R_4$
WHERE $R_4.b=V_1.b$
where $\theta_1$, $\theta_2 \in \{=, \neq, \geq, \leq, <, >\}$. The outer and inner joins specified in the above query cannot be reordered by the existing methods. This follows from the fact that view $V_1$ cannot be merged with the rest of the query because it contains a column (column c) that is generated by an aggregation operator. Hence, the join specified in view $V_1$ cannot be reordered with other outer and inner joins specified in the query.

Join-aggregate queries are known to be much more complex. Consider the following co-related join-aggregate query:

SELECT $R_1.a$ FROM $R_1$ WHERE $R_1.b$ $\theta_1$
(SELECT COUNT(*) FROM $R_2$ WHERE $R_2.c=R_1.c$ AND $R_2.d$ $\theta_2$
(SELECT COUNT(*) FROM $R_3$ WHERE $R_2.e=R_3.e$ AND $R_1.f=R_3.f$)), where $\theta_1$, $\theta_2 \in \{=, \neq, \geq, \leq, <, >\}$. Typical commercial relational data base management systems (RDBMS) execute the above co-related query using Tuple Iteration Semantics (TIS), wherein for every tuple in $R_1$, first, tuples in $R_2$ are selected by applying predicate $R_2.c=R_1.c$ and then each selected tuple in relation $R_2$ in turn, along with the tuple in $R_1$, is substituted in predicate $R_2.e=R_3.e$ and $R_1.f=R_3.f$ in order to first select and then count the selected tuples in relation $R_3$. This process is repeated for every tuple in $R_1$ resulting in a very inefficient processing strategy.

Prior work by [GANS87] and [MURA92], incorporated by reference herein, proposed a method to unnest the above query and to transform it into the following two queries that employ outer joins and do not require TIS:
Query 2
SELECT INTO TEMP
$R_1$.key, $R_1.a$, $R_2$.key, $R_2.b$
FROM (SELECT * FROM $R_1$ LEFTOUTERJOIN $R_2$ ON $R_1.c=R_2.c$), $R_3$ LEFTOUTERJOIN $R_2.e=R_3.e$ AND $R_1.f=R_3.f$
GROUPBY $R_1$.key, $R_1.a$, $R_2$.key, $R_2.b$
HAVING $R_2.d$ $\theta_2$count $(R_3$.key)
Query 3
SELECT $R_1.a$
FROM TEMP GROUPBY $R_1$.key HAVING $R_1.b\ \theta_1 count(R_2.key)$ One difficult problem in query optimization has been the inability to unnest join aggregate queries. While the transformation of such a query to an outer join is known, existing methods cannot reorder the left outer joins specified in Query 2 because of the complex predicate $R_2.e=R_3.e$ and $R_1.f=R_3.f$. In addition, the prior art has not described how to perform complete enumeration of queries containing outer joins, when the outer join predicate references an aggregated value, or the predicate references more than two base relations in a query subtree. The problem is important since hierarchical schemas are often found in the schemas translated from hierarchical legacy data bases used for RDBMS-based data warehousing applications and object oriented data bases.

Therefore, for more efficient processing of complex SQL queries, there is a need for reordering complex SQL queries that contain GROUPBYs, inner and outer joins.

SUMMARY OF THE INVENTION

To overcome the limitations in the prior art described above, and to overcome other limitations that will become apparent upon reading and understanding the present specification, the present invention discloses a method and apparatus for query simplification by applying generalized inference propagation and generalized transitive closure in SQL queries having selection, projection, join, outer join, and intersection operations. The disclosed transformations and enumeration method unify and solve the problems of (1) unnesting join aggregate queries, and (2) complete enumeration of queries containing outer joins, when the outer join predicate references an aggregated value, or the predicate references more than two base relations in a query subtree. The system first eliminates redundant sub-expressions and modifies expensive binary operations to inexpensive binary operations, then converts complex predicates to simple predicates by application of a generalized selection (GS) operator.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
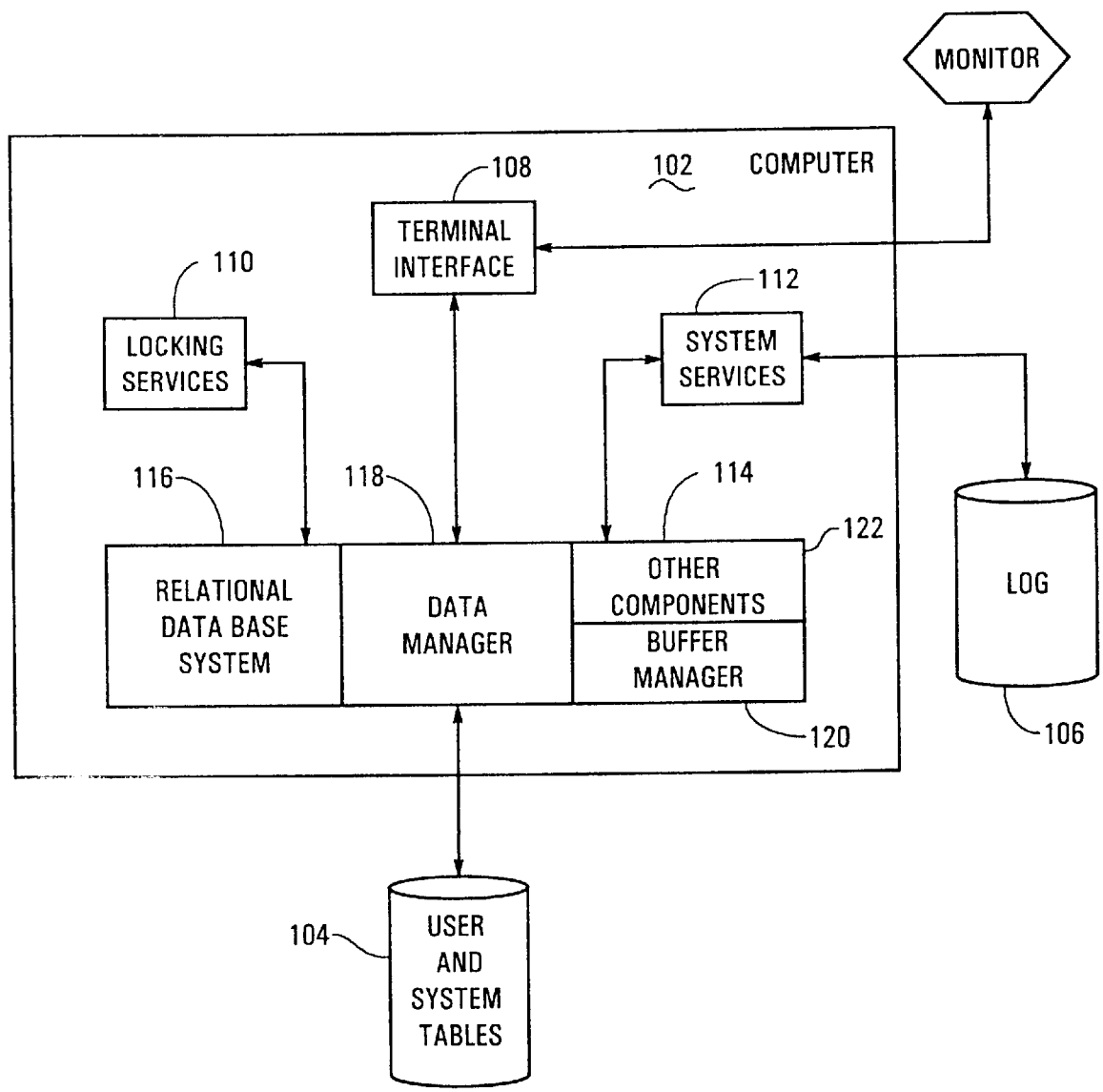
FIG. 1 illustrates the computer hardware environment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Definitions

Following are definitions for a number of terms used in SQL queries. These definitions are required for an understanding of later portions of the present specification.

Tuple

A tuple t is a mapping from a finite set of attributes, $R \cup V$, to a set of atomic (possibly null) values, where R is a non-empty set of real attributes and V is a non-empty set of virtual attributes, $R \cap V = \emptyset$, and a non-null value. For an attribute set X, $t[X]$ represents the values associated with attributes X under the mapping t, where $X \subseteq R \cup V$ and $X \neq \emptyset$.

The motivation behind the distinction between real and virtual attributes is to emphasize the difference between the real attributes available for manipulation (to the user of the RDBMS) and the virtual attributes used (by the RDBMS) for bookkeeping only. The set of real attributes of a tuple is the same as the schema of the tuple in the traditional relational algebra. These attributes are accessible to users and can be referenced externally, e.g., in user queries, etc. On the other hand, virtual attributes are (at times) used to provide unique conceptional tuple-ids to tuples, and are not accessible to users and cannot be referenced externally.

Relation

A relation r is a triple (R, V, E) where R is a non-empty set of real attributes, V is a non-empty set of virtual attributes, and E, the extension of relation r, is a set of tuples such that:

$$(\forall t_1 \in E)\ (\forall t_2 \in E)\ (t_1 \neq t_2 \Rightarrow t_1[V] \neq t_2[V])$$

In this definition, $R \cup V$ is called the schema of relation r.

Predicate

A predicate p over a set of real attributes sch(p) called the schema of p, is a total mapping from tuples to the Boolean values {TRUE, FALSE}, where sch(p) is the minimum set of attributes such that for all tuples $t_1$ and $t_2$:

$$(t_1[sch(p)] = t_2[sch(p)] \Rightarrow p(t_1) = p(t_2)).$$

For a tuple t with real schema $R \supseteq sch(p)$, p(t) is TRUE if and only if $(\forall A \in sch(p))$ (i.e., substitution of $t[A]$ for A in p causes it to evaluate to TRUE).

Null-intolerant

A predicate p is null-intolerant if p evaluates to FALSE for tuples undefined on one or more attributes in sch(p). More formally, p is null-intolerant if:

$$(\forall t)\ (\exists A \in sch(p))\ (t[A] = \text{NULL} \Rightarrow p(t) = \text{FALSE})$$

Throughout the remainder of the present specification, it is assumed that all predicates are null-intolerant.

Algebraic Operators

Following are definitions for algebraic operators used in SQL queries. These definitions are required for an understanding of later portions of the present specification.

Relations

Let $r = <R, V, E>$, $r_1 = <R_1, V_1, E_1>$ and $r_2 = <R_2, V_2, E_2>$ denote relations such that $R_1 \cap R_2 = \emptyset$ and $V_1 \cap V_2 = \emptyset$.

Projection

The projection, $\pi^a_X(r)$, of relation r onto attributes X is the relation $<X, V, E'>$ where $X \subseteq R$ and:

$E' = \{t.v | (\exists t' \in E) \ (t = t'[X] \wedge v = t'[V])\}$

The $\pi^a$ operator is a projection operator that does not remove "duplicates" in the real attributes part of the source expression. The superscript a in $\pi^a$ denotes the fact that all the virtual attributes of the source expression are included in the virtual schema of the result expression. For ease of reading, the superscript a is omitted from $\pi^a$ whenever there is no ambiguity, so it can be written simply as $\pi$.

The projection, $\pi^c_{X_R X_V}(r)$, of relation r on attributes $X_R X_V$ is the relation $<X_R, X_V, E'>$, where $X_R \subseteq R$, $X_V \subseteq V$ and:

$E' = \{t.v | (\exists t' \in E) \ (t = t'[X_R] \wedge v = t'[X_v])\}$

In contrast to $\pi$, $\pi^c$ allows a choice in the selection of the virtual attributes from the source expression. This operation is needed for defining the "Modified Generalized Outer Join" operator defined hereinafter.

Table 1 shows the extension of the relation, and also the evaluation of the expressions $\pi_{A_1}(r)$ and $\pi_{A_1 \ v_1}^c(r)$.

TABLE 1

Difference between $\pi$ and $\pi^c$.

| $A_1$ | $A_2$ | $v_1$ | $v_2$ | $A_1$ | $v_1$ | $v_2$ | $A_1$ | $v_1$ |
|---|---|---|---|---|---|---|---|---|
| a | b | 5 | 6 | a | 5 | 6 | a | 5 |
| a | c | 5 | 7 | a | 5 | 7 | d | 6 |
| d | e | 6 | 8 | d | 6 | 8 | (c)$\pi^c_{A_1 v_1}(r)$ | |
| (a)r | | | | (b)$\pi_{A_1}(r)$ | | | | |

Delta-Projection

The delta-projection, $\delta_{X_R X_V}(r)$, of relation r on attributes $X_R X_V$ is the relation $<X_R X_V, V_{new}, E'>$, where $X_R \subseteq R$, $X_V \subseteq V$, and:

$E' = \{t | (\exists t' \in E) \ (t'[X_R X_V] = t[X_R X_V] \wedge t[V_{new}])\}$ which is a new, unique value. The $\delta$ operator models the "SELECT DISTINCT . . . " construct of SQL which allows elimination of "duplicates" from a relation. The $\delta$ operator is called the distinct projection operator and produces a result relation which has distinct values on the attributes $X_R X_V$ and a new virtual attribute.

Generalized Projection

A Generalized Projection (GP), $\pi_{x, f(Y)}$, models the "GROUPBY . . . " construct of SQL, which accepts as its argument a relation r and produces a new relation according to the subscripts X and f(Y).

The subscript X specifies the attributes referenced in the GROUPBY statement. For instance, GP $\pi_X(r)$ represents SQL statement "SELECT X FROM r GROUPBY X". Note that a GP can also be used to represent a SQL "SELECT DISTINCT" statement. For instance, "SELECT DISTINCT X" can be represented by GP $\pi_X(r)$, i.e., by a GP with no aggregate function.

The subscript f(Y) specifies the aggregation (if present). For example, GP $\pi_{X, count(Y)}(r)$ represents the SQL statement "SELECT X, COUNT(Y) FROM r GROUPBY X". Some aggregate functions are duplicate-insensitive, e.g., MAX, MIN, COUNT(DISTINCT), etc. If a GP either represents the SELECT DISTINCT statement or contains a duplicate-insensitive function, then such a GP is termed a duplicate-insensitive GP and is denoted by $\delta_{X, f(Y)}$, where f$\in$\{MAX, MIN, COUNT(DISTINCT), AVG(DISTINCT), SUM (DISTINCT)\}.

Modified Generalized Outer Join

A modified generalized outer join (MGOJ) is described in the commonly assigned patent application Ser. No. 08/326,461, which has issued as U.S. Pat. No. 5,680,603, entitled "METHOD AND APPARATUS FOR REORDERING COMPLEX SQL QUERIES CONTAINING INNER AND OUTER JOIN OPERATIONS", filed on Oct. 20, 1994, by G. Bhargava et al., and incorporated herein by reference. The MGOJ is defined in terms of $\pi^c$ operator. Let $r_1 = <R_1, V_1, E_1>$ and $r_2 = <R_2, V_2, E_2>$ be two relations such that $R_1 \cap R_2 = \emptyset$ and $V_1 \cap V_2 = \emptyset$. Further, let $X_i = <R_{X_i}, V_{X_i}, E_{X_i}>$, $1 \leq i \leq n$, and $Y_{j=<R Y_j}, V_{Y_j}, E_{Y_j}$, $1 \leq j \leq m$, be relations such that $R_{X_i} \cap R_{X_k} = \emptyset = V_{X_i} \cap V_{X_k}$, $R_{Y_j} \cap R_{Y_k} = \emptyset = V_{Y_j} \cap V_{Y_k}$, $R_{X_i} \subseteq R_1$ and $R_{Y_j} \subseteq R_2$, where i$\neq$k,j$\neq$s, $1 \leq i,k \leq n$ and $1 \leq j,s \leq m$.

The modified generalized outer join (MGOJ), $r_1$ MGOJ[p, $R_{X_1}, \ldots, R_{X_n}, R_{Y_1}, \ldots, R_{Y_m}$] $r_2$, of relations $r_1$ and $r_2$ while preserving attributes $R_{X_i}$ and $R_{Y_j}$ is the relation $<R_1 R_2, V_1 V_2, E'>$, where $1 \leq i \leq n$, $1 \leq j \leq m$ and E' is given by:

$$E' = \left( E_1 \stackrel{p}{\bowtie} E_2 \right)$$

$$\uplus_{i=1}^n \left\{ t | t \in \left( \pi^{cV_{X_i}}_{R X_i}(E_1) - \pi^{cV_{X_i}}_{R X_i}\left( E_1 \stackrel{p}{\bowtie} E_2 \right)\right) \right\}$$

$$\uplus_{j=1}^m \left\{ t | t \in \left( \pi^{cV_{Y_j}}_{R Y_j}(E_1) - \pi^{cV_{R_j}}_{R Y_j}\left( E_1 \stackrel{p}{\bowtie} E_2 \right)\right) \right\}$$

$\pi^c_{R_{Xi} V_{Xi}}$

Selection

The selection, $\sigma_p(r)$, of relation r on predicate p is the relation (R,V,E'), where sch(p) $\subseteq$ R, and:

$E' = \{t | (t \in E) \wedge p(t)\}$

Cross Product and Difference

The cross product, $r_1 \times r_2$, and difference, $r_1 - r_2$, of relations $r_1$ and $r_2$ are the relations $<R_1 R_2, V_1 V_2, E_1 \times E_2>$ and $<R, V, E_1 - E_2>$, respectively.

Union Compatible

A relation $r_1 = <\{A_1, A_2, \ldots, A_n\}, V, E_1>$ is said to be union compatible with relation $r_2 = <\{B_1, B_2, \ldots, B_n\}, V, E_2>$ if there exists a permutation p of the numbers 1, 2, . . . , n such that domain $(A_i)$=domain $(B_{Pi})$, for $1 \leq i \leq$ n. That is, the attributes of $r_1$ and $r_2$ can be ordered such that the domains of the first attributes of $r_1$ and $r_2$ are the same, the domains of the second attributes of $r_1$ and $r_2$ are the same, and so on.

Union and Outer Union

The union, $r_1 \cup r_2$, of relations $r_1$ and $r_2$ is the relation $<R, V, E_1 \cup E_2>$. The outer union, $r_1 \uplus r_2$, is the relation $<R_1 \cup R_2, V_1 \cup V_2, E'>$, where:

$E' = \{t | (\exists t' \in E_1)(t[R_1 V_1] = t' \wedge (\forall A \in (R_2 - R_1) \cup (V_2 - V_1))(t[A] = \text{NULL}))$ $\wedge (\exists t'' \in E_2)(t[R_2 V_2] = t'' \wedge (\forall A \in (R_1 - R_2) \cup (V_1 - V_2))(t[A] = \text{NULL}))\}$ Note that rows in $r_1 \uplus r_2$ are padded with nulls for those attributes that are not present either in relation $r_1$ or in relation $r_2$.

Intersect Distinct

Let $r_1 = <\{A_1, A_2, \ldots, A_n\}, V, E_1>$ and $r_2 = <\{B_1, B_2, \ldots, B_n\}, V, E_2>$ be two union compatible relations. Then, the intersect distinct, $r_1 \cap_d r_2$, of $r_1$ and $r_2$ is the relation $<\{C_1, C_2, \ldots, C_n\}, V, E>$, where each $C_i$ is a possibly renamed version of the union compatible attribute pair $(A_i, B_i)$, $1 \leq i \leq n$, and $E = \{t | (\exists t_1 \in E_1) \ \exists t_2 \in E_2)(\forall i) < t[C_i] = t_1[A_i] \wedge t[C_i] = t_2[B_i] > \wedge t[V]$ is a new unique value\}

The intersect distinct operation retains the common tuples in relations $r_1$ and $r_2$. If a tuple $t_1 \epsilon E_1$ contains null value in attribute $A_i$ and $t_2 \epsilon E_2$ contains null value in attribute $B_i$, $1 \leq i \leq n$, and identical non-null values in the remaining attributes, then $t_1$ and $t_2$ are considered equivalent and only a single copy is retained in the result. In case there are duplicate tuples in either of the operands, only one copy of the common tuple is retained in the result. In contrast, the intersect all operator, denoted as $\cap_a$, retains "some" of the duplicate copies of the common tuples, subject to the "minimum rule". More precisely, in two union compatible relations $r_1$ and $r_2$, if a tuple t appears i times in $r_1$ and j times in $r_2$, then t appears min $\{i,j\}$ times in the result relation $r_1 \cap_a r_2$.

Additional Algebraic Operators

In the following definitions, it is assumed that if predicate p is associated with join/outer/full outer join of relations $r_1$ and $r_2$ then $p = p_1 \wedge p_2 \wedge \ldots \wedge p_m$, where $P_i$ is a predicate such that $sch(p_i) \cap R_1 \neq \emptyset$ and $sch(p_i) \cap R_2 \neq \emptyset$, $1 \leq i \leq m$.

Join,

The join, $$r_1 \underset{\bowtie}{\overset{p}{}} r_2,$$

of relations $r_1$ and $r_2$ is the relation $<R_1 R_2, V_1 V_2, E'>$, where:

$$E' = \{t | t \epsilon (E_1 \times E_2) \wedge p(t)\}$$

Anti-Join

The anti-join, $$r_1 \underset{\triangleright}{\overset{p}{}} r_2,$$

of relations $r_1$ and $r_2$ is the relation $<R_1, V_1, E'>$, where:

$$E' = \left( E_1 - \pi^c_{R_1 V_1} \left( E_1 \underset{\bowtie}{\overset{p}{}} E_2 \right) \right)$$

Left and Right Outer Joins

The left outer join, $$r_1 \overset{p}{\rightarrow} r_2,$$

is the relation $<R_1 R_2, V_1 V_2, E'>$, where:

$$E' = \left( E_1 \underset{\bowtie}{\overset{p}{}} E_2 \right) \uplus \left( E_1 - \pi^c_{R_1 V_1} \left( E_1 \underset{\bowtie}{\overset{p}{}} E_2 \right) \right)$$

Relation $r_1$ in the above definition is called the preserved relation and relation $r_2$ is called the null supplying relation. The right outer join, $$R_1 \overset{p}{\leftarrow} r_2,$$

can similarly be defined in which $r_1$ is the null supplying relation and $r_2$ is the preserved relation.

Full Outer join

The full outer join, $$r_1 \overset{p}{\leftrightarrow} r_2,$$

of relations $r_1$ and $r_2$ is the relation $<R_1 R_2, V_1 V_2, E'>$, where:

$$E' = \left( E_1 \underset{\bowtie}{\overset{p}{}} E_2 \right) \uplus \left( E_1 - \pi^c_{R_1 V_1} \left( E_1 \underset{\bowtie}{\overset{p}{}} E_2 \right) \right) \uplus \left( E_2 - \pi^c_{R_2 V_2} \left( E_1 \underset{\bowtie}{\overset{p}{}} E_2 \right) \right)$$

Overview

The following description of the present invention presents a novel operator, Generalized Selection (GS), which is used for complete reordering of queries containing complex predicates and predicates that are specified on columns generated by aggregations. The GS operator enables the generation of different schedules for queries similar to Query 2 and Query 3, given above in the background section. For example, Query 2 allows the generation of schedules in which relations $R_4$ and $R_1$ are joined first. Consequently, if this join is very selective then the join may substantially reduce the cost of the query. Further, the GS operator facilitates complete enumeration of those queries that contain only conjunctive predicates with binary operations. It is assumed that predicates specified with binary operations are conjunctive, that is, in expression:

$$X \overset{p}{\odot} Y$$

where:

$$\odot \epsilon \{\bowtie, \leftarrow, \rightarrow, \leftrightarrow\}$$

and predicate p is of the form:

$$p = p_1 \wedge p_2 \wedge \ldots p_n$$

In addition, association identities are provided that enable the "break-up" of complex predicates. Methods that generate an optimal plan for a given query are described with the aid of examples which explain the enumeration process.

Hardware Environment

FIG. 1 illustrates an exemplary computer hardware environment that could be used with the present invention. In the exemplary environment, a computer system 102 is comprised of one or more processors connected to one or more electronic storage devices 104 and 106, such as disk drives, that store one or more relational databases.

Operators of the computer system 102 use a standard operator interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS)

software. In the preferred embodiment of the present invention, the RDBMS software comprises the DB2 product offered by IBM for the MVS or OS/2 operating systems. Those skilled in the art will recognize, however, that the present invention has application to any RDBMS software that uses SQL.

As illustrated in FIG. 1, the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e., definition, access control, retrieval, and update of user and system data.

The present invention is generally implemented as one or more functions within the RDBMS software. Generally, the RDBMS software is tangibly embodied in a computer-readable medium, e.g. one or more of the data storage devices 104 and 106. Moreover, the RDBMS software is comprised of instructions which, when read and executed by the computer system 102, causes the computer system 102 to perform the steps necessary to implement and/or use the present invention. Under control of an operating system, the RDBMS software may be loaded from the data storage devices 104 and 106 into a memory of the computer system 102 for use during actual operations.

Interactive Sql Execution

Figure 2:
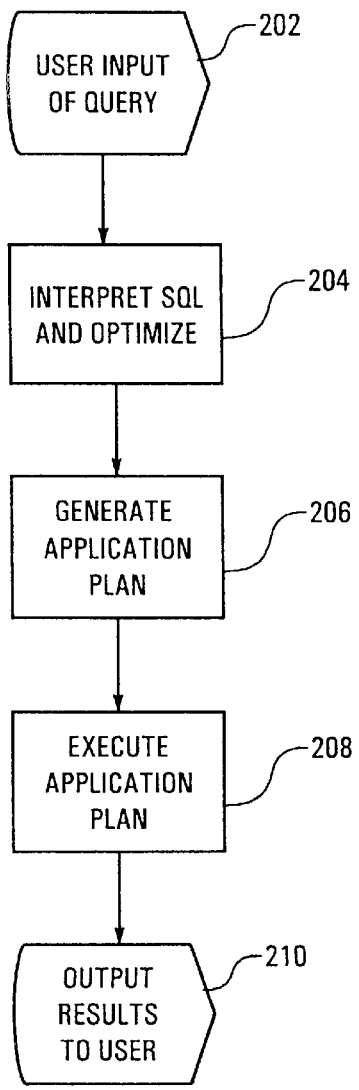
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may transform the SQL query in a manner described in more detail later in this specification. Block 206 represents the step of generating a compiled set of runtime structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Embedded/Batch Sql Execution

Figure 3:
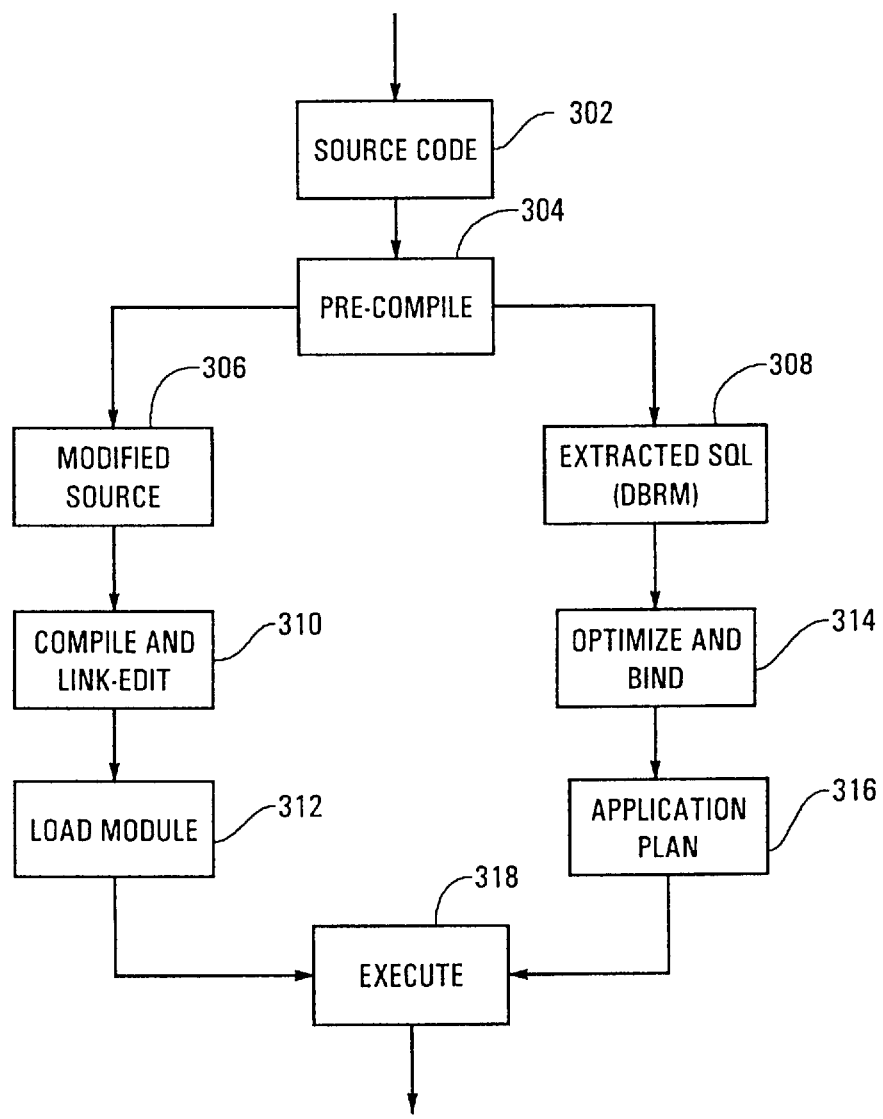
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

Sql Query Optimization

Figure 4:
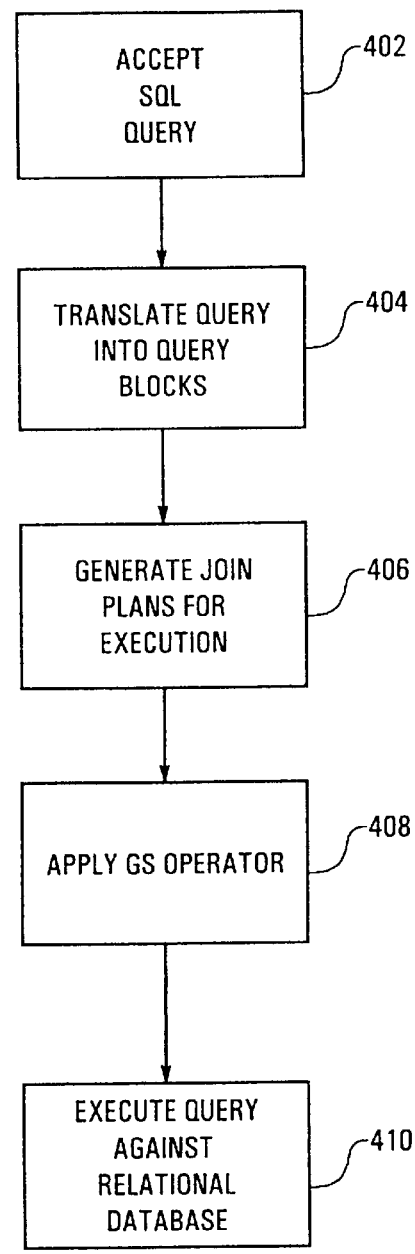
FIG. 4 is a flowchart illustrating a method of optimizing SQL queries of the present invention.

FIG. 4 is a flowchart illustrating the method of optimizing SQL queries in steps 204 of FIG. 2 and 314 of FIG. 3 according to the present invention. Block 402 represents the RDBMS software accepting the SQL query. Block 404 represents the RDBMS software translating the query into one or more query blocks, which are representations of the outer query and any subqueries or inner queries within the outer query, wherein the query blocks are an internal representation of the user's query maintained in the memory of the computer system 102 by the RDBMS software. Block 406 represents the RDBMS software generating join plans from the query blocks. Block 408 represents the RDBMS software applying the GS operator, as described in more detail in conjunction with FIG. 5. Finally, block 410 represents the RDBMS software executing the query blocks against the relational database and the output of the result table to the operator.

Generalized Selection (Gs) Operator

Consider the following query:

$$Q_1 = X_1 \xrightarrow{p_{1,2} \wedge p_{1,3}} \left( X_2 \underset{\bowtie}{\overset{p_{2,3}}{}} X_3 \right)$$

If only joins, outer and full outer joins are employed, then this query can only be executed in the manner in which it is specified. In order to re-order this query and other similar queries, a new Generalized Selection (GS) σ*. Operator is defined that enables the generation of other plans such as:

$$\sigma^*_{p_{1,3}}[X_1] \left( \left( X_1 \xrightarrow{p_{1,2}} X_2 \right) MGOJ[p_{2,3}, X_1] X_3 \right)$$

and

-continued $$\sigma^*_{p_{1,2}}[X_1]\left(\left(X_1 \xrightarrow{p_{1,3}} X_3\right) MGOJ[p_{2,3},X_1]X_2\right).$$

In the following definition, let $r_1=<R_1,V_1,E_1>$, $r_2=<R_2, V_2, E_2>$ and $r_3=<R_3, V_3, E_3>$ be three relations such that $R_2 \subseteq R_1$, $R_3 \subseteq R_1$, $R_2 \cap R_3 = \emptyset$, $V_2 \subseteq V_1$, $V_3 \subseteq V_1$, and $V_2 \cap V_3 = \emptyset$; also, let p denote a null-intolerant predicate in $R_1$.

The Generalized Selection (GS), $\sigma_p^*[r_2, r_3](r_1)$, of relation $r_1$ with respect to relations $r_2$ and $r_3$ is the relation $<R_1, V_1, E'>$, where E' is given by:

$$E' = \sigma_p(r_1) \uplus \{\pi_{R_2^c V_2}(r_1) - \pi_{R_2^c V_2}(\sigma_p(r_1))\} \uplus \{\pi_{R_3^c V_3}(r_1) - \pi_{R_3^c V_3}(\sigma_p(r_1))\}$$

It will be noted that, if neither $r_2$ or $r_3$ is empty, then the corresponding term in E' is also empty; if both the relations are empty then both the terms corresponding to these relations are also empty, and the resultant relation is obtained by applying predicate p to relation $r_1$.

Simplification Identities For Generalized Selection

Let $X_i = <R_i, V_i, E_i>$, where $1 \leq i \leq 3$, be expressions, $p_{i,j}$ denote the predicates between expressions $X_i$ and $X_j$, then:

Simplification Identity (1)

$$X_1 \xrightarrow{p_{1,2}^1 \wedge p_{1,2}^2} X_2 = \sigma^*_{p_{1,2}^1}[X_1]\left(X_1 \xrightarrow{p_{1,2}^2} X_2\right)$$

Simplification Identity (2)

$$X_1 \xleftrightarrow{p_{1,2}^1 \wedge p_{1,2}^2} X_2 = \sigma^*_{p_{1,2}^1}[X_1,X_2]\left(X_1 \xleftrightarrow{p_{1,2}^2} X_2\right)$$

Simplification Identity (3)

$$\left(X_1 \odot X_2\right) \xrightarrow{p_{1,3} \wedge p_{2,3}} X_3 = \sigma^*_{p_{1,3}}[X_1,X_2]\left(\left(X_1 \odot X_2\right) \xrightarrow{p_{2,3}} X_3\right),$$
where $\odot \in \{\bowtie, \rightarrow, \leftarrow, \leftrightarrow\}$ Simplification Identity (4)

$$\left(X_1 \odot X_2\right) \xleftrightarrow{p_{1,3} \wedge p_{2,3}} X_3 = \sigma^*_{p_{1,3}}[X_1,X_2,X_3]\left(\left(X_1 \odot X_2\right) \xleftrightarrow{p_{2,3}} X_3\right),$$
where $\odot \in \{\bowtie, \rightarrow, \leftarrow, \leftrightarrow\}$ It will be noted that in the above-described identities, a complex predicate is specified with the last operator. If a complex predicate is specified with the next to the last operator, then:

Simplification Identity (5)

$$X_1 \xrightarrow{p_{1,2}}\left(X_2 \xleftrightarrow{p_{2,3}^1 \wedge p_{2,3}^2} X_3\right) = \sigma^*_{p_{2,3}^1}[X_1,X_2]\left(X_1 \xrightarrow{p_{1,2}}\left(X_2 \xrightarrow{p_{2,3}^2} X_3\right)\right)$$

Simplification Identity (6)

$$X_1 \xrightarrow{p_{1,2}}\left(X_2 \xrightarrow{p_{2,3}^1 \wedge p_{2,3}^2} X_3\right) = \sigma^*_{p_{2,3}^1}[X_1,X_2]\left(X_1 \xrightarrow{p_{1,2}}\left(X_2 \xrightarrow{p_{2,3}^2} X_3\right)\right),$$

Simplification Identity (7)

$$X_1 \xrightarrow{p_{1,2}}\left(X_2 \xrightarrow{p_{2,3}^1 \wedge p_{2,3}^2} X_3\right) = \sigma^*_{p_{2,3}^1}[X_1]\left(X_1 \xrightarrow{p_{1,2}}\left(X_2 \bowtie X_3\right)\right),$$

Simplification Identity (8)

$$\left(X_1 \xrightarrow{p_{1,2}^1 \wedge p_{1,2}^2} X_2\right) \xrightarrow{p_{1,3}} X_3 = \sigma^*_{p_{1,2}^1}[X_1,X_3]\left(\left(X_1 \xrightarrow{p_{1,2}^2} X_2\right) \xrightarrow{p_{1,3}} X_3\right)$$

Simplification Identity (9)

$$X_1 \xleftrightarrow{p_{1,2}}\left(X_2 \bowtie \xrightarrow{p_{2,3}^1 \wedge p_{2,3}^2} X_3\right) = \sigma^*_{p_{2,3}^1}[X_1,X_2,X_3]\left(X_1 \xleftrightarrow{p_{1,2}}\left(X_2 \bowtie X_3\right)\right)$$

Simplification Identity (10)

$$X_1 \xleftrightarrow{p_{1,2}}\left(X_2 \xrightarrow{p_{2,3}^1 \wedge p_{2,3}^2} X_3\right) = \sigma^*_{p_{2,3}^1}[X_1,X_2]\left(X_1 \xleftrightarrow{p_{1,2}}\left(X_2 \xrightarrow{p_{2,3}^2} X_3\right)\right)$$

Simplification Identity (11)

$$X_1 \xleftrightarrow{p_{1,2}}\left(X_2 \xleftarrow{p_{2,3}^1 \wedge p_{2,3}^2} X_3\right) = \sigma^*_{p_{2,3}^1}[X_1,X_3]\left(X_1 \xleftrightarrow{p_{1,2}}\left(X_2 \xleftarrow{p_{2,3}^2} X_3\right)\right)$$

Simplification Identity (12)

$$X_1 \xleftrightarrow{p_{1,2}}\left(X_2 \xleftrightarrow{p_{2,3}^1 \wedge p_{2,3}^2} X_3\right) = \sigma^*_{p_{2,3}^1}[X_1,X_2,X_3]\left(X_1 \xleftrightarrow{p_{1,2}}\left(X_2 \xleftrightarrow{p_{2,3}^2} X_3\right)\right)$$

Simplification Identity (13)

$$X_1 \xleftrightarrow{p_{1,2}}\left(\left(X_2 \bowtie \xrightarrow{p_{2,3}^1 \wedge p_{2,3}^2} X_3\right) \xleftarrow{p_{2,4}} X_4\right) =$$

-continued $$\sigma^*_{p^1_{2,3}}[X_1,X_4]\left(X_1 \overset{p_{1,2}}{\leftrightarrow} \left(\left(X_2 \overset{p^2_{2,3}}{\bowtie} X_3\right) \overset{p_{2,4}}{\leftarrow} X_4\right)\right)$$

In general, if more than one complex predicate is present in a given expression, then it can be shown that the given expression can be transformed into a resultant expression in which all join predicates are simple. That is, complex predicates are applied such that some of the predicates are applied with the join operators and remaining predicates are applied with the GS operators that appear at the top in the resultant expression.

For example, consider expression:

$$Q_1 = X_0 \overset{p_{0,1}}{\leftrightarrow} X_1 \overset{p_{1,2} \wedge p_{1,3}}{\leftrightarrow} \left(X_2 \overset{p^1_{2,3} \wedge p^2_{2,3}}{\to} X_3\right)$$

By associative properties of outer joins, expression $Q_1$ is equivalent to the following expression:

$$\left(X_1 \overset{p_{0,1}}{\leftrightarrow} X_0\right) \overset{p_{1,2} \wedge p_{1,3}}{\leftrightarrow} \left(X_2 \overset{p^1_{2,3} \wedge p^2_{2,3}}{\leftrightarrow} X_3\right).$$

By applying Simplification Identity (4), the above expression can be transformed to the following expression:

$$\sigma^*_{p_{1,2}}[X_0X_1,X_2X_3]\left(\left(X_1 \overset{p_{0,1}}{\leftrightarrow} X_0\right) \overset{p_{1,3}}{\leftrightarrow} \left(X_2 \overset{p^1_{2,3} \wedge p^2_{2,3}}{\leftrightarrow} X_3\right)\right).$$

At this point, by applying Simplification Identity (10), the above expression can be further transformed to the following expression:

Simplification Identity (14)

$$\sigma^*_{p_{1,2}}[X_0X_1,X_2X_3]\left(\sigma^{*1}_{p_{2,3}}[X_0X_1X_2]\left(\left(X_1 \overset{p_{0,1}}{\leftrightarrow} X_0\right) \overset{p_{1,3}}{\leftrightarrow} \left(X_2 \overset{p^2_{2,3}}{\to} X_3\right)\right)\right)$$

It will be noted that the last expression does not contain any complex predicates.

Method For Enumerating Plans

Figure 5:
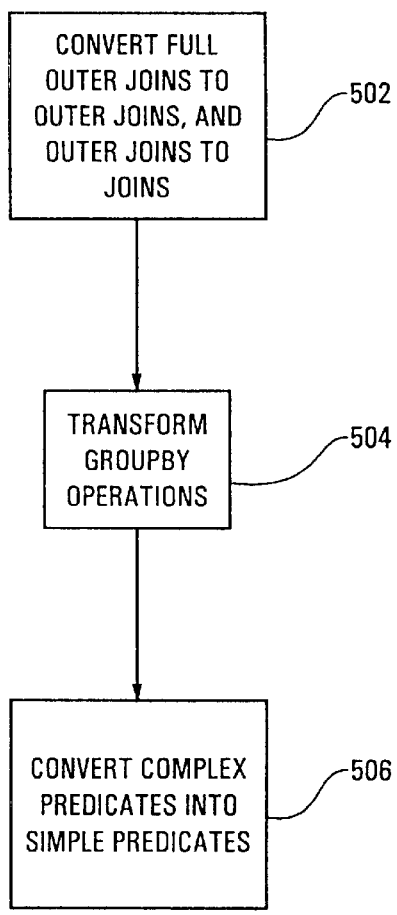
FIG. 5 is a flowchart illustrating a method of RDBMS software performing the application of a generalized selection (GS) operator according to the present invention.
Figure 6:
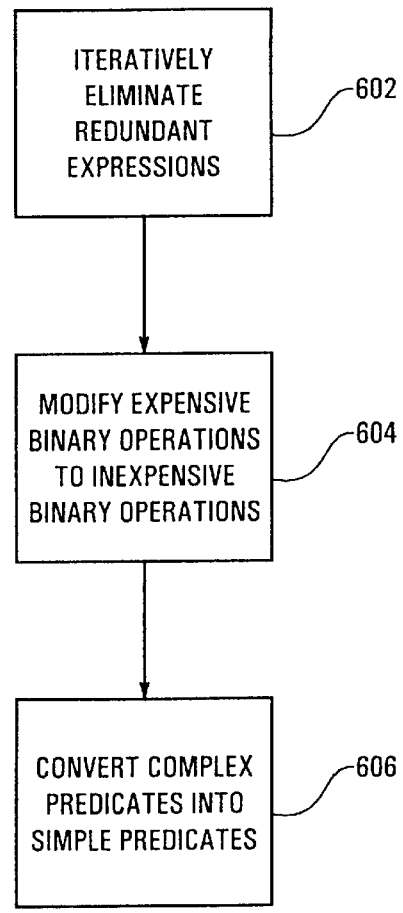
FIG. 6 is a flowchart illustrating a method of removing redundant sub-expressions and simplifying complex expressions according to the present invention.

FIG. 5 is a flowchart illustrating the method used by the RDBMS software to apply the GS operator in step 408 of FIG. 4 according to the present invention. FIG. 6 is a flowchart illustrating a method used by the RDBMS software to remove redundant sub-expressions and simplify complex expressions according to the present invention. The method to enumerate plans for queries consists of the following sub-methods:

(a) Simplification. In this sub-method, attributes are identified by the RDBMS software at 502 and 602 that are preserved by the initial query specification, but which are not needed to be preserved by analysis of the query structure. The beneficial effect is to convert some full outer joins to outer joins, and some outer joins to regular joins. This step reduces the cost by pruning away redundant sub-expressions and by converting expensive binary operations to in-expensive binary operations. The actual mechanism of this step is detailed in [BHAR95], which is incorporated by reference herein. Of course, those skilled in the art will recognize that the simplification step covers more queries than disclosed herein. p1 (b) "Dam" (due to aggregation) destruction. At 504 and 604, aggregation or GROUPBY operators which have been dealt with by commercial RDBMS query optimizers as firewalls across which reorderings are not considered, and the results provided in [SEL179], incorporated by reference herein, are individually applied to each query block by the RDBMS software. Results described in [HARI94, LEVY94, PIRA92, PAUL93], incorporated by reference herein, may be used to systematically break-down these firewalls generated by query sub-blocks. The primary technique involves the application of simplification identities (1) through (14) stated for the SELECT DISTINCT operator, and from an observation made for the "push-up" of GROUPBY operator.

An additional technique is given below which is required to handle predicates that reference columns generated by aggregations. This technique addresses outer-join predicates on the aggregated GROUPBY attributes. The technique is explained by means of an example. Consider the following view $X_2$:

CREATE VIEW $X_2$ ($X_{2,1}$, $X_{2,2}$) AS
(SELECT $Y_1$,AVG($Y_2$) FROM Y GROUPBY $Y_1$)

Consider the following query $Q_2$ that references view $X_2$:

$$X_1 \overset{p^1_{1,2} \wedge p^2_{1,2}}{\to} X_2 = \sigma^*_{p^2_{1,2}}[X_1]\left(\pi_{x_2x_1v_1,x_{2,2}=avg(Y_2)}\left(\left(X_1 \overset{p^1_{1,2}}{\to} Y\right)\right)\right)$$

where:

$$sch(p_{1,2}{}^2) \cap X_2 = X_{2,2}$$

and $$X_{2,2} \notin sch(p^{1,1,2}) \cap X_2$$

It will be noted, as shown in the right hand side, the aggregation has been moved up in the transformed query, permitting a complete reordering of expression:

$$\left(X_1 \overset{p^1_{1,2}}{\to} Y\right)$$

In general, it is feasible to move aggregations past all the binary operations specified in a given query (including outerjoins), thus, enabling the complete enumeration of different binary operations specified in the query.

(c) Conversion of complex predicates to simple predicates. In FIGS. 5 and 6, at 506 and 606, a query containing complex predicates is converted by the RDBMS software into a query containing only simple predicates, but induced at the root are the instances of generalized selections. This step is a pre-cursor to the complete reordering of relations. One such conversion for query $Q_1$ is given in simplification identity (14) above. Query $Q_1$ has two complex predicates and, therefore, four ways to convert the query to transformed queries containing only simple predicates. Other ways to break up the complex predicates are given in the following:

Simplification Identity (15)

$$\sigma^*_{p_{1,2}}[X_0X_1X_2X_3]\left(\sigma^{*2}_{p_{2,3}}[X_0X_1X_2]\left(\left(X_1 \overset{p_{0,1}}{\leftrightarrow} X_0\right)^{p_{1,3}} \overset{}{\leftrightarrow} \left(X_2 \overset{p^1_{2,3}}{\leftrightarrow} X_3\right)\right)\right)$$

Simplification Identity (16)

$$\sigma^*_{p_{1,3}}[X_0X_1X_2X_3]\left(\sigma^{*1}_{p_{2,3}}[X_0X_1X_2]\left(\left(X_1 \overset{p_{0,1}}{\leftrightarrow} X_0\right)^{p_{1,3}} \overset{}{\leftrightarrow} \left(X_2 \overset{p^2_{2,3}}{\leftrightarrow} X_3\right)\right)\right)$$

Simplification Identity (17)

$$\sigma^*_{p_{1,3}}[X_0X_1X_2X_3]\left(\sigma^{*2}_{p_{2,3}}[X_0X_1X_2]\left(\left(X_1 \overset{p_{0,1}}{\leftrightarrow} X_0\right)^{p_{1,3}} \overset{}{\leftrightarrow} \left(X_2 \overset{p^1_{2,3}}{\leftrightarrow} X_3\right)\right)\right)$$

It will be noted that the above identities do not have any complex outerjoins predicate. Thus, by combining the methods of the present invention and of [GALI92a], incorporated by reference herein, all possible plans for the binary operations specified in a query would be enumerated. Using cost estimation, the one with the lowest cost becomes a candidate for execution.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method and apparatus for query simplification using generalized inference propagation and generalized transitive closure in SQL queries having selection, projection, join, outer join, and intersection operations. The disclosed transformations and enumeration method unify and solve the problems of (1) unnesting join aggregate queries, and (2) complete enumeration of queries containing outer joins, when the outer join predicate references an aggregated value, or the predicate references more than two base relations in a query subtree.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of simplifying a query performed by a computer to retrieve data from a database stored in an electronic storage device, the method comprising the steps of:

(a) accepting the query into the computer; and (b) simplifying the query by replacing a first expression in the query comprising:

$$p^1_{1,2} \wedge p^2_{1,2}$$
$$X_1 \rightarrow X_2$$

with a second expression comprising:

$$\sigma^*_{p^1_{1,2}}[X_1](X_1 \rightarrow X_2).$$

2. An apparatus for simplifying a query performed by a computer to retrieve data from a database stored in an electronic storage device, comprising:

(a) a computer;

(b) means for accepting the query into the computer; and (c) means for simplifying the query by replacing a first expression in the query comprising:

$$p^1_{1,2} \wedge p^2_{1,2}$$
$$X_1 \rightarrow X_2$$

with a second expression comprising:

$$p^2_{1,2}$$
$$\sigma^*_{p^1_{1,2}}[X_1](X_1 \rightarrow X_2).$$

3. An article of manufacture comprising a computer program carrier embodying one or more instructions of a method of simplifying a query performed by a computer to retrieve data from a database stored in an electronic storage device, the method comprising the steps of:

(a) accepting the query into the computer; and (b) simplifying the query by replacing a first expression in the query comprising:

$$p^1_{1,2} \wedge p^2_{1,2}$$
$$X_1 \rightarrow X_2$$

with a second expression comprising:

$$p^2_{1,2}$$
$$\sigma^*_{p^1_{1,2}}[X_1](X_1 \rightarrow X_2).$$

4. A method of simplifying a query performed by a computer to retrieve data from a database stored in an electronic storage device, the method comprising the steps of:

(a) accepting the query into the computer; and (b) simplifying the query by replacing a first expression in the query comprising:

$$p^1_{1,2} \wedge p^2_{1,2}$$
$$X_1 \leftrightarrow X_2$$

with a second expression comprising:

$$\sigma^{*1}_{p^1_{1,2}}[X_1](X_1 \leftrightarrow X_2).$$

5. An apparatus for simplifying a query performed by a computer to retrieve data from a database stored in an electronic storage device, comprising:

(a) a computer;
(b) means for accepting the query into the computer; and
(c) means for simplifying the query by replacing a first expression in the query comprising:

$$X_1 \overset{p^1_{1,2} \wedge p^2_{1,2}}{\leftrightarrow} X_2$$

with a second expression comprising:

$$\sigma^{*1}_{P_{1,2}}[X_1, X_2] \left( X_1 \overset{p^2_{1,2}}{\leftrightarrow} X_2 \right).$$

6. An article of manufacture comprising a computer program carrier embodying one or more instructions of a method of simplifying a query performed by a computer to retrieve data from a database stored in an electronic storage device, the method comprising the steps of:

(a) accepting the query into the computer; and
(b) simplifying the query by replacing a first expression in the query comprising:

$$X_1 \overset{p^1_{1,2} \wedge p^2_{1,2}}{\leftrightarrow} X_2$$

with a second expression comprising:

$$\sigma^{*1}_{P_{1,2}}[X_1, X_2] \left( X_1 \overset{p^2_{1,2}}{\leftrightarrow} X_2 \right).$$

7. A method of simplifying a query performed by a computer to retrieve data from a database stored in an electronic storage device, the method comprising the steps of:

(a) accepting the query into the computer; and
(b) simplifying the query by replacing a first expression in the query comprising:

$$\left( X_1 \overset{p_{1,2}}{\odot} X_2 \right) \overset{p_{1,3} \wedge p_{2,3}}{\rightarrow} X_3$$

with a second expression comprising:

$$\sigma^*_{P_{1,3}}[X_1 X_2] \left( \left( X_1 \overset{p_{1,2}}{\odot} X_2 \right) \overset{p_{2,3}}{\rightarrow} X_3 \right)$$

wherein $\odot \in \{\leftarrow, \rightarrow, \leftrightarrow, \bowtie\}$.

8. An apparatus for simplifying a query performed by a computer to retrieve data from a database stored in an electronic storage device, comprising:

(a) a computer;
(b) means for accepting the query into the computer; and
(c) means for simplifying the query by replacing a first expression in the query comprising:

$$\left( X_1 \overset{p_{1,2}}{\odot} X_2 \right) \overset{p_{1,3} \wedge p_{2,3}}{\rightarrow} X_3$$

with a second expression comprising:

$$\sigma^*_{P_{1,3}}[X_1 X_2] \left( \left( X_1 \overset{p_{1,2}}{\odot} X_2 \right) \overset{p_{2,3}}{\rightarrow} X_3 \right)$$

wherein $\odot \in \{\leftarrow, \rightarrow, \leftrightarrow, \bowtie\}$.

9. An article of manufacture comprising a computer program carrier embodying one or more instructions of a method of simplifying a query performed by a computer to retrieve data from a database stored in an electronic storage device, the method comprising the steps of:

(a) accepting the query into the computer; and
(b) simplifying the query by replacing a first expression in the query comprising:

$$\left( X_1 \overset{p_{1,2}}{\odot} X_2 \right) \overset{p_{1,3} \wedge p_{2,3}}{\rightarrow} X_3$$

with a second expression comprising:

$$\sigma^*_{P_{1,3}}[X_1 X_2] \left( \left( X_1 \overset{p_{1,2}}{\odot} X_2 \right) \overset{p_{2,3}}{\rightarrow} X_3 \right)$$

wherein $\odot \in \{\leftarrow, \rightarrow, \leftrightarrow, \bowtie\}$.

10. A method of simplifying a query performed by a computer to retrieve data from a database stored in an electronic storage device, the method comprising the steps of:

(a) accepting the query into the computer; and
(b) simplifying the query by replacing a first expression in the query comprising:

$$\left( X_1 \overset{p_{1,2}}{\odot} X_2 \right) \overset{p_{1,3} \wedge p_{2,3}}{\rightarrow} X_3$$

with a second expression comprising:

$$\sigma^*_{P_{1,3}}[X_1 X_2, X_3] \left( \left( X_1 \overset{p_{1,2}}{\odot} X_2 \right) \overset{p_{2,3}}{\leftrightarrow} X_3 \right)$$

wherein $\odot \in \{\leftarrow, \rightarrow, \leftrightarrow, \bowtie\}$.

11. An apparatus for simplifying a query performed by a computer to retrieve data from a database stored in an electronic storage device, comprising:

(a) a computer;
(b) means for accepting the query into the computer; and
(c) means for simplifying the query by replacing a first expression in the query comprising:

$$\left(X_1 \underset{\odot}{\overset{p_{1,2}}{}} X_2\right)^{p_{1,3}} \overset{\wedge p_{2,3}}{\rightarrow} X_3$$

with a second expression comprising:

$$\sigma^*_{p_{1,3}}[X_1 X_2, X_3]\left(\left(X_1 \underset{\odot}{\overset{p_{1,2}}{}} X_2\right) \underset{\leftrightarrow}{\overset{p_{2,3}}{}} X_3\right)$$

wherein $\odot \in \{\leftarrow, \rightarrow, \leftrightarrow, \bowtie\}$.

12. An article of manufacture comprising a computer program carrier embodying one or more instructions of a method of simplifying a query performed by a computer to retrieve data from a database stored in an electronic storage device, the method comprising the steps of:

(a) accepting the query into the computer; and (b) simplifying the query by replacing a first expression in the query comprising:

$$\left(X_1 \underset{\odot}{\overset{p_{1,2}}{}} X_2\right)^{p_{1,3}} \overset{\wedge p_{2,3}}{\rightarrow} X_3$$

with a second expression comprising:

$$\sigma^*_{p_{1,3}}[X_1 X_2, X_3]\left(\left(X_1 \underset{\odot}{\overset{p_{1,2}}{}} X_2\right) \underset{\leftrightarrow}{\overset{p_{2,3}}{}} X_3\right)$$

wherein $\odot \in \{\leftarrow, \rightarrow, \leftrightarrow, \bowtie\}$.

13. A method of simplifying a query performed by a computer to retrieve data from a database stored in an electronic storage device, the method comprising the steps of:

(a) accepting the query into the computer; and (b) simplifying the query by replacing a first expression in the query comprising:

$$X_1 \underset{\bowtie}{\overset{p_{1,2}}{}} \left(X_2 \underset{\rightarrow}{\overset{p^1_{2,3} \wedge p^2_{2,3}}{}} X_3\right)$$

with a second expression comprising:

$$\sigma^{*1}_{p_{2,3}}[X_1 X_2]\left(X_1 \underset{\bowtie}{\overset{p_{1,2}}{}} \left(X_2 \underset{\rightarrow}{\overset{p^2_{2,3}}{}} X_3\right)\right).$$

14. An apparatus for simplifying a query performed by a computer to retrieve data from a database stored in an electronic storage device, comprising:

(a) a computer;

(b) means for accepting the query into the computer; and (c) means for simplifying the query by replacing a first expression in the query comprising:

$$X_1 \underset{\bowtie}{\overset{p_{1,2}}{}} \left(X_2 \underset{\rightarrow}{\overset{p^1_{2,3} \wedge p^2_{2,3}}{}} X_3\right)$$

with a second expression comprising:

$$\sigma^{*1}_{p_{2,3}}[X_1 X_2]\left(X_1 \underset{\bowtie}{\overset{p_{1,2}}{}} \left(X_2 \underset{\rightarrow}{\overset{p^2_{2,3}}{}} X_3\right)\right).$$

15. An article of manufacture comprising a computer program carrier embodying one or more instructions of a method of simplifying a query performed by a computer to retrieve data from a database stored in an electronic storage device, the method comprising the steps of:

(a) accepting the query into the computer; and (b) simplifying the query by replacing a first expression in the query comprising:

$$X_1 \underset{\bowtie}{\overset{p_{1,2}}{}} \left(X_2 \underset{\rightarrow}{\overset{p^1_{2,3} \wedge p^2_{2,3}}{}} X_3\right)$$

with a second expression comprising:

$$\sigma^{*1}_{p_{2,3}}[X_1 X_2]\left(X_1 \underset{\bowtie}{\overset{p_{1,2}}{}} \left(X_2 \underset{\rightarrow}{\overset{p^2_{2,3}}{}} X_3\right)\right).$$

16. A method of simplifying a query performed by a computer to retrieve data from a database stored in an electronic storage device, the method comprising the steps of:

(a) accepting the query into the computer; and (b) simplifying the query by replacing a first expression in the query comprising:

$$X_1 \overset{p_{1,2}}{\rightarrow} \left(X_2 \underset{\rightarrow}{\overset{p^1_{2,3} \wedge p^2_{2,3}}{}} X_3\right)$$

with a second expression comprising:

$$\sigma^{*1}_{p_{2,3}}[X_1 X_2]\left(X_1 \overset{p_{1,2}}{\bowtie} \left(X_2 \underset{\rightarrow}{\overset{p^2_{2,3}}{}} X_3\right)\right).$$

17. An apparatus for simplifying a query performed by a computer to retrieve data from a database stored in an electronic storage device, comprising:

(a) a computer;

(b) means for accepting the query into the computer; and (c) means for simplifying the query by replacing a first expression in the query comprising:

$$X_1 \overset{p_{1,2}}{\rightarrow} \left(X_2 \underset{\rightarrow}{\overset{p^1_{2,3} \wedge p^2_{2,3}}{}} X_3\right)$$

with a second expression comprising:

$$\sigma^{*1}_{p_{2,3}}[X_1 X_2]\left(X_1 \overset{p_{1,2}}{\rightarrow} \left(X_2 \underset{\rightarrow}{\overset{p^2_{2,3}}{}} X_3\right)\right).$$

18. An article of manufacture comprising a computer program carrier embodying one or more instructions of a method of simplifying a query performed by a computer to retrieve data from a database stored in an electronic storage device, the method comprising the steps of:

(a) accepting the query into the computer; and
(b) simplifying the query by replacing a first expression in the query comprising:

$$X_1 \xrightarrow{p_{1,2}} \left( X_2 \xrightarrow{p_{2,3}^1 \wedge p_{2,3}^2} X_3 \right)$$

with a second expression comprising:

$$\sigma^{*1}_{p_{2,3}}[X_1 X_2] \left( X_1 \xrightarrow{p_{1,2}} \left( X_2 \xrightarrow{p_{2,3}^2} X_3 \right) \right).$$

19. A method of simplifying a query performed by a computer to retrieve data from a database stored in an electronic storage device, the method comprising the steps of:

(a) accepting the query into the computer; and
(b) simplifying the query by replacing a first expression in the query comprising:

$$X_1 \xrightarrow{p_{1,2}} \left( X_2 \xrightarrow{p_{2,3}^1 \wedge p_{2,3}^2}_{\bowtie} X_3 \right)$$

with a second expression comprising:

$$\sigma^{*1}_{p_{2,3}}[X_1] \left( X_1 \xrightarrow{p_{1,2}} \left( X_2 \xrightarrow{p_{2,3}^2}_{\bowtie} X_3 \right) \right).$$

20. An apparatus for simplifying a query performed by a computer to retrieve data from a database stored in an electronic storage device, comprising:

(a) a computer; and
(b) means for accepting the query into the computer; and
(c) means for simplifying the query by replacing a first expression in the query comprising:

$$X_1 \xrightarrow{p_{1,2}} \left( X_2 \xrightarrow{p_{2,3}^1 \wedge p_{2,3}^2}_{\bowtie} X_3 \right)$$

with a second expression comprising:

$$\sigma^{*1}_{p_{2,3}}[X_1] \left( X_1 \xrightarrow{p_{1,2}} \left( X_2 \xrightarrow{p_{2,3}^2}_{\bowtie} X_3 \right) \right).$$

21. An article of manufacture comprising a computer program carrier embodying one or more instructions of a method of simplifying a query performed by a computer to retrieve data from a database stored in an electronic storage device, the method comprising the steps of:

(a) accepting the query into the computer; and
(b) simplifying the query by replacing a first expression in the query comprising:

$$X_1 \xrightarrow{p_{1,2}} \left( X_2 \xrightarrow{p_{2,3}^1 \wedge p_{2,3}^2}_{\bowtie} X_3 \right)$$

with a second expression comprising:

$$\sigma^{*1}_{p_{2,3}}[X_1] \left( X_1 \xrightarrow{p_{1,2}} \left( X_2 \xrightarrow{p_{2,3}^2}_{\bowtie} X_3 \right) \right).$$

22. A method of simplifying a query performed by a computer to retrieve data from a database stored in an electronic storage device, the method comprising the steps of:

(a) accepting the query into the computer; and
(b) simplifying the query by replacing a first expression in the query comprising:

$$\left( X_1 \xrightarrow{p_{1,2}^1 \wedge p_{1,2}^2} X_2 \right) \xrightarrow{p_{1,3}} X_3$$

with a second expression comprising:

$$\sigma^{*1}_{p_{1,2}}[X_1 X_3] \left( \left( X_1 \xrightarrow{p_{1,2}^2} X_2 \right) \xrightarrow{p_{1,3}} X_3 \right).$$

23. An apparatus for simplifying a query performed by a computer to retrieve data from a database stored in an electronic storage device, comprising:

(a) a computer;
(b) means for accepting the query into the computer; and
(c) means for simplifying the query by replacing a first expression in the query comprising:

$$\left( X_1 \xrightarrow{p_{1,2}^1 \wedge p_{1,2}^2} X_2 \right) \xrightarrow{p_{1,3}} X_3$$

with a second expression comprising:

$$\sigma^{*1}_{p_{1,2}}[X_1 X_3] \left( \left( X_1 \xrightarrow{p_{1,2}^2} X_2 \right) \xrightarrow{p_{1,3}} X_3 \right).$$

24. An article of manufacture comprising a computer program carrier embodying one or more instructions of a method of simplifying a query performed by a computer to retrieve data from a database stored in an electronic storage device, the method comprising the steps of:

(a) accepting the query into the computer; and
(b) simplifying the query by replacing a first expression in the query comprising:

$$\left( X_1 \xrightarrow{p_{1,2}^1 \wedge p_{1,2}^2} X_2 \right) \xrightarrow{p_{1,3}} X_3$$

with a second expression comprising:

$$\sigma^{*1}_{P_{1,2}}[X_1 X_3]\left(\left(X_1 \xrightarrow{p^2_{1,2}} X_2\right)^{p_{1,3}} \to X_3\right).$$

25. A method of simplifying a query performed by a computer to retrieve data from a database stored in an electronic storage device, the method comprising the steps of:
   (a) accepting the query into the computer; and
   (b) simplifying the query by replacing a first expression in the query comprising:

$$X_1 \xrightarrow{p_{1,2}} \left(X_2 \xrightarrow{p^1_{2,3} \wedge p^2_{2,3}} X_3\right)$$

with a second expression comprising:

$$\sigma^{*1}_{P_{2,3}}[X_1, X_2 X_3]\left(X_1 \xrightarrow{p_{1,2}} \left(X_2 \xrightarrow{p^2_{2,3}} X_3\right)\right).$$

26. An apparatus for simplifying a query performed by a computer to retrieve data from a database stored in an electronic storage device, comprising:
   (a) a computer;
   (b) means for accepting the query into the computer; and
   (c) means for simplifying the query by replacing a first expression in the query comprising:

$$X_1 \xrightarrow{p_{1,2}} \left(X_2 \xrightarrow{p^1_{2,3} \wedge p^2_{2,3}} X_3\right)$$

with a second expression comprising:

$$\sigma^{*1}_{P_{2,3}}[X_1, X_2 X_3]\left(X_1 \xrightarrow{p_{1,2}} \left(X_2 \xrightarrow{p^2_{2,3}} X_3\right)\right).$$

27. An article of manufacture comprising a computer program carrier embodying one or more instructions of a method of simplifying a query performed by a computer to retrieve data from a database stored in an electronic storage device, the method comprising the steps of:
   (a) accepting the query into the computer; and
   (b) simplifying the query by replacing a first expression in the query comprising:

$$X_1 \xrightarrow{p_{1,2}} \left(X_2 \xrightarrow{p^1_{2,3} \wedge p^2_{2,3}} X_3\right)$$

with a second expression comprising:

$$\sigma^{*1}_{P_{2,3}}[X_1, X_2 X_3]\left(X_1 \xrightarrow{p_{1,2}} \left(X_2 \xrightarrow{p^2_{2,3}} X_3\right)\right).$$

28. A method of simplifying a query performed by a computer to retrieve data from a database stored in an electronic storage device, the method comprising the steps of:
   (a) accepting the query into the computer; and
   (b) simplifying the query by replacing a first expression in the query comprising:

$$X_1 \xrightarrow{p_{1,2}} \left(X_2 \xrightarrow{p^1_{2,3} \wedge p^2_{2,3}} X_3\right)$$

with a second expression comprising:

$$\sigma^{*1}_{P_{2,3}}[X_1, X_2 X_3]\left(X_1 \xrightarrow{p_{1,2}} \left(X_2 \xrightarrow{p^2_{2,3}} X_3\right)\right).$$

29. An apparatus for simplifying a query performed by a computer to retrieve data from a database stored in an electronic storage device, comprising:
   (a) a computer;
   (b) means for accepting the query into the computer; and
   (c) means for simplifying the query by replacing a first expression in the query comprising:

$$X_1 \xrightarrow{p_{1,2}} \left(X_2 \xrightarrow{p^1_{2,3} \wedge p^2_{2,3}} X_3\right)$$

with a second expression comprising:

$$\sigma^{*1}_{P_{2,3}}[X_1 X_2]\left(X_1 \xrightarrow{p_{1,2}} \left(X_2 \xrightarrow{p^2_{2,3}} X_3\right)\right).$$

30. An article of manufacture comprising a computer program carrier embodying one or more instructions of a method of simplifying a query performed by a computer to retrieve data from a database stored in an electronic storage device, the method comprising the steps of:
   (a) accepting the query into the computer; and
   (b) simplifying the query by replacing a first expression in the query comprising:

$$X_1 \xrightarrow{p_{1,2}} \left(X_2 \xrightarrow{p^1_{2,3} \wedge p^2_{2,3}} X_3\right)$$

with a second expression comprising:

$$\sigma^{*1}_{P_{2,3}}[X_1 X_2]\left(X_1 \xrightarrow{p_{1,2}} \left(X_2 \xrightarrow{p^2_{2,3}} X_3\right)\right).$$

31. A method of simplifying a query performed by a computer to retrieve data from a database stored in an electronic storage device, the method comprising the steps of:
   (a) accepting the query into the computer; and
   (b) simplifying the query by replacing a first expression in the query comprising:

$$X_1 \overset{p_{1,2}}{\leftrightarrow} \left( X_2 \overset{p^1_{2,3} \wedge p^2_{2,3}}{\leftarrow} X_3 \right)$$

with a second expression comprising:

$$\sigma^{*1}_{P_{2,3}}[X_1, X_3]\left( X_1 \overset{p_{1,2}}{\leftrightarrow} \left( X_2 \overset{p^2_{2,3}}{\leftarrow} X_3 \right) \right).$$

32. An apparatus for simplifying a query performed by a computer to retrieve data from a database stored in an electronic storage device, comprising:

(a) a computer;

(b) means for accepting the query into the computer; and (c) means for simplifying the query by replacing a first expression in the query comprising:

$$X_1 \overset{p_{1,2}}{\leftrightarrow} \left( X_2 \overset{p^1_{2,3} \wedge p^2_{2,3}}{\leftarrow} X_3 \right)$$

with a second expression comprising:

$$\sigma^{*1}_{P_{2,3}}[X_1, X_3]\left( X_1 \overset{p_{1,2}}{\leftrightarrow} \left( X_2 \overset{p^2_{2,3}}{\leftarrow} X_3 \right) \right).$$

33. An article of manufacture comprising a computer program carrier embodying one or more instructions of a method of simplifying a query performed by a computer to retrieve data from a database stored in an electronic storage device, the method comprising the steps of:

(a) accepting the query into the computer; and (b) simplifying the query by replacing a first expression in the query comprising:

$$X_1 \overset{p_{1,2}}{\leftrightarrow} \left( X_2 \overset{p^1_{2,3} \wedge p^2_{2,3}}{\leftarrow} X_3 \right)$$

with a second expression comprising:

$$\sigma^{*1}_{P_{2,3}}[X_1, X_3]\left( X_1 \overset{p_{1,2}}{\leftrightarrow} \left( X_2 \overset{p^2_{2,3}}{\leftarrow} X_3 \right) \right).$$

34. A method of simplifying a query performed by a computer to retrieve data from a database stored in an electronic storage device, the method comprising the steps of:

(a) accepting the query into the computer; and (b) simplifying the query by replacing a first expression in the query comprising:

$$X_1 \overset{p_{1,2}}{\leftrightarrow} \left( X_2 \overset{p^1_{2,3} \wedge p^2_{2,3}}{\leftrightarrow} X_3 \right)$$

with a second expression comprising:

$$\sigma^{*1}_{P_{2,3}}[X_1 X_2, X_3]\left( X_1 \overset{p_{1,2}}{\leftrightarrow} \left( X_2 \overset{p^2_{2,3}}{\leftrightarrow} X_3 \right) \right).$$

35. An apparatus for simplifying a query performed by a computer to retrieve data from a database stored in an electronic storage device, comprising:

(a) a computer;

(b) means for accepting the query into the computer; and (c) means for simplifying the query by replacing a first expression in the query comprising:

$$X_1 \overset{p_{1,2}}{\leftrightarrow} \left( X_2 \overset{p^1_{2,3} \wedge p^2_{2,3}}{\leftrightarrow} X_3 \right)$$

with a second expression comprising:

$$\sigma^{*1}_{P_{2,3}}[X_1 X_2, X_3]\left( X_1 \overset{p_{1,2}}{\leftrightarrow} \left( X_2 \overset{p^2_{2,3}}{\leftrightarrow} X_3 \right) \right).$$

36. An article of manufacture comprising a computer program carrier embodying one or more instructions of a method of simplifying a query performed by a computer to retrieve data from a database stored in an electronic storage device, the method comprising the steps of:

(a) accepting the query into the computer; and (b) simplifying the query by replacing a first expression in the query comprising:

$$X_1 \overset{p_{1,2}}{\leftrightarrow} \left( X_2 \overset{p^1_{2,3} \wedge p^2_{2,3}}{\leftrightarrow} X_3 \right)$$

with a second expression comprising:

$$\sigma^{*1}_{P_{2,3}}[X_1 X_2, X_3]\left( X_1 \overset{p_{1,2}}{\leftrightarrow} \left( X_2 \overset{p^2_{2,3}}{\leftrightarrow} X_3 \right) \right).$$

37. A method of simplifying a query performed by a computer to retrieve data from a database stored in an electronic storage device, the method comprising the steps of:

(a) accepting the query into the computer; and (b) simplifying the query by replacing a first expression in the query comprising:

$$X_1 \overset{p_{1,2}}{\leftrightarrow} \left( \left( X_2 \overset{p^1_{2,3} \wedge p^2_{2,3}}{\bowtie} X_3 \right) \overset{p_{2,4}}{\leftarrow} X_4 \right)$$

with a second expression comprising:

$$\sigma^{*1}_{P_{2,3}}[X_1, X_4]\left( X_1 \overset{p_{1,2}}{\leftrightarrow} \left( \left( X_2 \overset{p^2_{2,3}}{\bowtie} X_3 \right) \overset{p_{2,4}}{\leftarrow} X_4 \right) \right).$$

38. An apparatus for simplifying a query performed by a computer to retrieve data from a database stored in an electronic storage device, comprising:

(a) a computer;
(b) means for accepting the query into the computer; and
(c) means for simplifying the query by replacing a first expression in the query comprising:

$$X_1 \stackrel{p_{1,2}}{\leftrightarrow} \left( \left( X_2 \stackrel{p_{2,3}^1 \wedge p_{2,3}^2}{\bowtie} X_3 \right) \stackrel{p_{2,4}}{\leftarrow} X_4 \right)$$

with a second expression comprising:

$$\sigma^{*1}_{p_{2,3}}[X_1, X_4] \left( X_1 \stackrel{p_{1,2}}{\leftrightarrow} \left( \left( X_2 \stackrel{p_{2,3}^2}{\bowtie} X_3 \right) \stackrel{p_{2,4}}{\leftarrow} X_4 \right) \right).$$

39. An article of manufacture comprising a computer program carrier embodying one or more instructions of a method of simplifying a query performed by a computer to retrieve data from a database stored in an electronic storage device, the method comprising the steps of:
   (a) accepting the query into the computer; and
   (b) simplifying the query by replacing a first expression in the query comprising:

$$X_1 \stackrel{p_{1,2}}{\leftrightarrow} \left( \left( X_2 \stackrel{p_{2,3}^1 \wedge p_{2,3}^2}{\bowtie} X_3 \right) \stackrel{p_{2,4}}{\leftarrow} X_4 \right)$$

with a second expression comprising:

$$\sigma^{*1}_{p_{2,3}}[X_1, X_4] \left( X_1 \stackrel{p_{1,2}}{\leftrightarrow} \left( \left( X_2 \stackrel{p_{2,3}^2}{\bowtie} X_3 \right) \stackrel{p_{2,4}}{\leftarrow} X_4 \right) \right).$$

* * * * *

UNITED STATES PATENT AND TRADEMARK OFFICE
CERTIFICATE OF CORRECTION

PATENT NO. : 5,875,447
DATED : February 23, 1999
INVENTOR(S) : Piyush Goel, et. al.

Page 1 of 3

It is certified that error appears in the above-identified patent and that said Letters Patent is hereby corrected as shown below:

Cover Page, Column 2, in the Chang reference, the word "Closure" should read --Closures--

Column 17, Claim 5, Lines 20-24, delete " $\sigma^{*1}_{P_{1,2}}$ " and replace with -- $\sigma^{*1}_{p_{1,2}}$ --

Column 17, Claim 6, Lines 40-44, delete " $\sigma^{*1}_{P_{1,2}}$ " and replace with -- $\sigma^{*1}_{p_{1,2}}$ --

Column 19, Claim 13, Lines 49-54, delete " $\sigma^{*1}_{P_{2,3}}$ " and replace with -- $\sigma^{*1}_{p_{2,3}}$ --

Column 20, Claim 14, Lines 2-6, delete " $\sigma^{*1}_{P_{2,3}}$ " and replace with -- $\sigma^{*1}_{p_{2,3}}$ --

Column 20, Claim 15, Line 25, delete " $\sigma^{*1}_{P_{2,3}}$ " and replace with -- $\sigma^{*1}_{p_{2,3}}$ --

Column 20, Claim 16, Lines 41-45, delete " $\sigma^{*1}_{P_{2,3}}$ " and replace with -- $\sigma^{*1}_{p_{2,3}}$ --

Column 20, Claim 17, Lines 61-64, delete " $\sigma^{*1}_{P_{2,3}}$ " and replace with -- $\sigma^{*1}_{p_{2,3}}$ --

Column 21, Claim 18, Lines 15-19, delete " $\sigma^{*1}_{P_{2,3}}$ " and replace with -- $\sigma^{*1}_{p_{2,3}}$ --

Column 21, Claim 19, Lines 34-38, " $\sigma^{*1}_{P_{2,3}}$ " and replace with -- $\sigma^{*1}_{p_{2,3}}$ --

Column 21, Claim 20, Line 43, after "computer;" delete "and"

Column 21, Claim 20, Lines 55-59, delete " $\sigma^{*1}_{P_{2,3}}$ " and replace with -- $\sigma^{*1}_{p_{2,3}}$ --

UNITED STATES PATENT AND TRADEMARK OFFICE
CERTIFICATE OF CORRECTION

PATENT NO. : 5,875,447
DATED : February 23, 1999
INVENTOR(S) : Piyush Goel, et. al.

It is certified that error appears in the above-identified patent and that said Letters Patent is hereby corrected as shown below:

Column 22, Claim 21, Line 10, delete "$\sigma^{*1}_{p_{2,3}}$" and replace with -- $\sigma^{*}_{p^{1}_{2,3}}$ --

Column 22, Claim 22, Line 30, delete "$\sigma^{*1}_{p_{1,2}}$" and replace with -- $\sigma^{*}_{p^{1}_{1,2}}$ --

Column 22, Claim 23, Line 50, delete "$\sigma^{*1}_{p_{1,2}}$" and replace with -- $\sigma^{*}_{p^{1}_{1,2}}$ --

Column 23, Claim 24, Lines 2-5, delete "$\sigma^{*1}_{p_{1,2}}$" and replace with -- $\sigma^{*}_{p^{1}_{1,2}}$ --

Column 23, Claim 25, Lines 21-24, delete "$\sigma^{*1}_{p_{2,3}}$" and replace with -- $\sigma^{*}_{p^{1}_{2,3}}$ --

Column 23, Claim 26, Lines 39-43, delete "$\sigma^{*1}_{p_{2,3}}$" and replace with -- $\sigma^{*}_{p^{1}_{2,3}}$ --

Column 23, Claim 27, Lines 59-63, delete "$\sigma^{*1}_{p_{2,3}}$" and replace with -- $\sigma^{*}_{p^{1}_{2,3}}$ --

Column 24, Claim 28, Lines 11-15, delete "$\sigma^{*1}_{p_{2,3}}$" and replace with -- $\sigma^{*}_{p^{1}_{2,3}}$ --

Column 24, Claim 28, Lines 11-15, after "X$_2$" delete "X$_3$"

Column 24, Claim 29, Lines 32-36, delete "$\sigma^{*1}_{p_{2,3}}$" and replace with -- $\sigma^{*}_{p^{1}_{2,3}}$ --

Column 24, Claim 30, Lines 55-59, delete "$\sigma^{*1}_{p_{2,3}}$" and replace with -- $\sigma^{*}_{p^{1}_{2,3}}$ --

UNITED STATES PATENT AND TRADEMARK OFFICE
CERTIFICATE OF CORRECTION

PATENT NO. : 5,875,447
DATED : February 23, 1999
INVENTOR(S) : Piyush Goel, et. al.

It is certified that error appears in the above-identified patent and that said Letters Patent is hereby corrected as shown below:

Column 25, Claim 31, Line 10, delete "$\sigma^{*1}_{p_{2,3}}$" and replace with -- $\sigma^{*1}_{p^1_{2,3}}$ --

Column 25, Claim 32, Line 30, delete "$\sigma^{*1}_{p_{2,3}}$" and replace with -- $\sigma^{*1}_{p^1_{2,3}}$ --

Column 25, Claim 33, Lines 49-53, delete "$\sigma^{*1}_{p_{2,3}}$" and replace with -- $\sigma^{*1}_{p^1_{2,3}}$ --

Column 26, Claim 34, Lines 3-6, delete "$\sigma^{*1}_{p_{2,3}}$" and replace with -- $\sigma^{*1}_{p^1_{2,3}}$ --

Column 26, Claim 35, Lines 21-24, delete "$\sigma^{*1}_{p_{2,3}}$" and replace with -- $\sigma^{*1}_{p^1_{2,3}}$ --

Column 26, Claim 36, Lines 41-44, delete "$\sigma^{*1}_{p_{2,3}}$" and replace with -- $\sigma^{*1}_{p^1_{2,3}}$ --

Column 26, Claim 37, Lines 61-63, delete "$\sigma^{*1}_{p_{2,3}}$" and replace with -- $\sigma^{*1}_{p^1_{2,3}}$ --

Column 27, Claim 38, Lines 12-15, delete "$\sigma^{*1}_{p_{2,3}}$" and replace with -- $\sigma^{*1}_{p^1_{2,3}}$ --

Column 28, Claim 39, Line 15, delete "$\sigma^{*1}_{p_{2,3}}$" and replace with -- $\sigma^{*1}_{p^1_{2,3}}$ --

Signed and Sealed this

Thirtieth Day of May, 2000

Attest:

Q. TODD DICKINSON

*Attesting Officer*                *Director of Patents and Trademarks*